United States Patent
Hui et al.

(10) Patent No.: US 7,496,142 B2
(45) Date of Patent: *Feb. 24, 2009

(54) MOVING PICTURES ENCODING WITH CONSTANT OVERALL BIT-RATE

(75) Inventors: Yau Wai Lucas Hui, Singapore (SG); Hong Lye Oh, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 363 days.

This patent is subject to a terminal disclaimer.

(21) Appl. No.: 11/386,184

(22) Filed: Mar. 22, 2006

(65) Prior Publication Data

US 2006/0159169 A1 Jul. 20, 2006

Related U.S. Application Data (63) Continuation of application No. 09/646,716, filed as application No. PCT/SG98/00022 on Mar. 20, 1998, now Pat. No. 7,092,441.

(51) Int. Cl.
*H04N 7/12* (2006.01)

(52) U.S. Cl. ............. 375/240.03; 375/240; 375/240.01; 375/240.02

(58) Field of Classification Search ................. 375/240, 375/240.01, 240.02, 240.03, 240.04, 240.12
See application file for complete search history.

(56) References Cited

U.S. PATENT DOCUMENTS

| 5,333,012 A | * | 7/1994 | Singhal et al. | 375/240.04 |
| 5,598,213 A | | 1/1997 | Chung et al. | 348/405 |
| 5,606,371 A | | 2/1997 | Klein Gunnewiek et al. | 348/405 |
| 5,617,145 A | | 4/1997 | Huang et al. | 348/423 |
| 5,623,424 A | | 4/1997 | Azadegan et al. | 364/514 R |
| 5,650,860 A | | 7/1997 | Uz | 358/430 |
| 5,892,548 A | | 4/1999 | Kim | 348/405 |

FOREIGN PATENT DOCUMENTS

EP 0 804 035 A2 10/1997

\* cited by examiner

*Primary Examiner*—Allen Wong
(74) *Attorney, Agent, or Firm*—Lisa K. Jorgenson; David V. Carlson (57) ABSTRACT

A method and apparatus control bit rates used in a moving pictures encoder, such as an MPEG standard encoder. A sequence of moving pictures is divided into segments each of which comprises one or more groups of pictures. A constant overall bit rate is specified for the sequence of pictures, but variable bit rate encoding used within each segment. A difference between the number of bits allocated for encoding the segment and the actual bits used for encoding is determined, and the difference distributed over one or more subsequent segments.

31 Claims, 6 Drawing Sheets

MOVING PICTURES ENCODING WITH CONSTANT OVERALL BIT-RATE

CROSS-REFERENCE TO RELATED APPLICATION

This application is a continuation of U.S. patent application Ser. No. 09/646,716, filed Oct. 3, 2001, now pending which application is incorporated herein by reference in its entirety.

BACKGROUND OF THE INVENTION

1. Field of the Invention

The present invention relates to a method and apparatus for encoding moving pictures. In particular, the present invention relates to a method and apparatus for performing variable bit rate control in a digital video encoder while maintaining a particular overall bit-rate.

2. Description of the Related Art

One of the main obstacles faced by industry dealing with digital video processing, storage and transmission is the large amount of data needed to represent analog video in the digital domain. Accordingly, digital compression is often applied to moving pictures to achieve a reduction in required transmission bandwidth or storage size. One variety of such compression techniques can be derived from the ISO/IEC MPEG Standards, the ISO/IEC 11172-3(MPEG-1), the ISO/IEC 13818-2 (MPEG-2) and the MPEG-2 TM5 (test model 5), developed by the Moving Picture Experts Group of the International Organization for Standardization. The disclosures of those standards documents are hereby expressly incorporated into this specification by reference. MPEG-1 is the compression standard used in Video CD while MPEG-2 is the video compression standard used in DVD and many digital broadcasting systems.

The MPEG standards specify only the syntax of the compressed bit streams and method of decoding. The method of implementation in the encoder is left to the developer, and any form of encoder may be employed as long as the resulting bit stream conforms with the specified syntax.

In certain applications such as video storage device (recorder), it is possible to use variable bit rate (VBR) encoding. A VBR encoder is able to vary its output bit-rate over a larger range than a CBR encoder, and this would generate an output which has a more constant visual quality. An example of a VBR encoder is described in U.S. Pat. No. 5,650,860, entitled "Adaptive Quantization". In order to maintain a maximum bit rate allowed by the target storage device as well as an overall bit-rate which enables input picture sequence to be stored into a defined storage space, such VBR encoders utilize multiple encoding passes.

In the first encoding pass, the bit utilization information is determined for each scene or each picture in the input sequence. This may be done by fixing the reference quantization step size and disabling the VBV control. The determined bit utilization information is then used to generate a bit budget for each scene or picture such that an overall target number of bits to code the sequence is fixed, and that the maximum bit rate is not violated. In cases that bit utilization information obtained is not close to that required for generating the bit budget, steps from the first coding pass must be repeated with an adjusted reference quantization step-size. The input sequence is coded in a final pass using the generated bit budget information to achieve the target bits or overall bit rate.

Multiple-pass VBR encoders requires large storage memory for intermediate bit utilization information, and large computation needs for the additional passes and bit budget generation. Furthermore, such a VBR encoder cannot process input sequences in real-time as required by certain applications.

BRIEF SUMMARY OF THE INVENTION

It is an object of the present invention to provide a single-pass real-time variable bit rate encoder for moving pictures. It is also an object of the present invention to provide variable bit rate encoding of moving pictures such that the change in encoded picture quality from one scene to another is minimized. A further object is to provide a real-time variable bit rate encoding algorithm which produces a constant overall bit rate.

In particular, the present invention encodes an input moving pictures sequence one segment at a time according to a target encoding quality which is determined by a target segment bit rate. The target segment bit rate of a current segment is preferably derived from the differences between the target segment bit rates and the actual coding bit rates of previous or previous few encoded segments.

To maintain consistent encoding quality for all pictures within a segment, the actual target bit rate for encoding the pictures is made variable according to their scene complexities as well as the target encoding quality of the segment.

As the target encoding quality of each segment is modified based on the differences between the target and the actual bit rates of previous or previous few encoded segments, the change of target encoding quality from segment to segment is made relatively smooth compared to that of a Constant Bit-Rate Encoder, and furthermore, the overall bit rate of encoding is maintained constant.

In accordance with the present invention, there is provided a method for use in a moving pictures encoder for encoding a sequence of segments each having a least one image, comprising the steps of:

a) determining an overall target bit rate for encoding the sequence of images;

b) determining a bit allocation and target quantization step size for encoding a first segment on the basis of a segment target bit rate calculated using said overall target bit rate;

c) encoding said first segment using a variable bit rate encoding method according to the target quantization step size;

d) determining a difference between the number of bits used to encode said first segment and said first segment bit allocation;

e) distributing said difference for use in encoding at least one subsequent segment to determine a subsequent segment bit allocation;

f) determining a new target quantization step size for encoding a said subsequent segment on the basis of a new target segment bit rate calculated using said segment target bit rate and the distributed difference; and g) encoding said subsequent segment using a variable bit rate encoding method according to the new target quantization step size;

wherein variable bit rate encoding is employed for encoding pictures within a segment whilst maintaining a substantially constant bit rate over said sequence.

The present invention also provides a method for encoding moving pictures in a moving pictures encoder wherein a sequence of images are provided as input, the sequence of images comprising a plurality of segments each having a plurality of images, the method including:

a) determining an overall target bit rate for encoding the sequence of images;

b) maintaining a distribution record of bits from at least one previously encoded segment allocated for use in encoding at least one segment to be encoded;

c) determining a target segment bit rate for a segment of the sequence of images on the basis of the overall target bit rate and a bit rate change calculated from the corresponding allocated bits from the distribution record;

d) determining a target segment encoding quality from the target segment bit rate, a preceding target segment bit rate and a preceding target segment encoding quality; and e) encoding the images of the segment according to the target segment encoding quality using a variable bit rate encoding technique taking into account scene complexities of the images in the segment;

wherein maintaining said distribution record includes determining a difference between the number of bits used to encode a particular segment and the number of bits allocated for encoding the particular segment on the basis of the target segment encoding quality.

According to the current invention, a moving pictures sequence is divided into segments.

The size of each segment may be suitably determined. Each segment is encoded with a target encoding quality derived from its target segment bit rate. A variable bit rate (VBR) encoder is utilized to encode the segment according to its target encoding quality.

The target segment bit rate of an initial segment is obtained from a user defined target overall bit rate. After encoding the segment, the difference between the actual bit rate used and the target segment bit rate is obtained. This difference is propagated to the next or next few segments to be coded. This process is repeated for each segment; therefore, for each subsequent segment, a new target segment bit rate is determined from the user defined target overall bit rate and the differences between the target segment bit rates and actual bit rates of previous or previous few segments.

The present invention further provides a method for controlling bit allocation in a moving pictures encoder for encoding a sequence of images comprising a plurality of segments each having a plurality of images, the method including, for each segment:

determining a difference between a number of bits used for encoding a previous segment and a number of bits allocated for encoding the previous segment;

calculating a bits distribution from the determined bits difference and a predetermined distribution function;

calculating a bit rate change from the bits distribution and a predetermined number of images in the segment;

calculating a target segment bit rate from the bit rate change and a predetermined target overall bit rate for the sequence of images; and determining a target segment encoding quality from the target segment bit rate.

The present invention further provides an encoding quality adjustment processor for generating a target segment encoding quality value in a moving pictures encoder for encoding a series of segments each having at least one image using a variable bit rate encoding scheme whilst maintaining a substantially constant overall bit rate, comprising:

a bits difference computation means coupled to receive a segment encoding bit utilization value and a target segment bit rate and generate therefrom a bits difference value representing a difference in bits allocated and bits used for encoding a segment;

a bits distribution means coupled to the bits difference computation means for computing at least one bits distribution value from the bits difference value and a predetermined distribution function;

a bit rate difference computation means coupled to the bits distribution means for computing a segment bit rate difference from the at least one bits distribution value and a predetermined number of images in a segment;

a target segment bit rate adjustment means coupled to the bit rate difference computation means and the bits difference computation means for computing said target segment bit rate from the segment bit rate difference and a predetermined target overall bit rate for the sequence of segments; and an encoding quality computation means coupled to the target segment bit rate adjustment means for computing a target segment encoding quality value from said target segment bit rate.

The present invention further provides a moving pictures encoder comprising:

a coding processor for encoding picture data based on macroblocks according to a quantization step size;

a virtual buffer processor coupled to the coding processor for tracking a number of bits used for encoding successive macroblocks in a picture and a number of bits used for encoding successive pictures in a group of pictures;

a quantization step size processor coupled to the coding processor for determining said quantization step size from a target number bits allocated for a picture and the number of bits already used for encoding macroblocks in that picture;

a picture bit allocation processor coupled to the quantization step size processor for determining said target number of bits allocated for a picture from a target bit rate and the number of bits already used for encoding pictures in a current group of pictures;

a bit rate adjustment processor coupled to the picture bit allocation processor, the virtual buffer processor and the quantization step size processor for determining said target bit rate from the number of bits already used for encoding successive pictures in the current group of pictures, a target encoding quantization step size and an average quantization step size for pictures in the current group of pictures; and a target encoding quantization step size processor coupled to the bit rate adjustment processor and the virtual buffer processor for determining said target encoding quantization step size from a predetermined target overall bit rate and the number of bits used for encoding a preceding group of pictures.

BRIEF DESCRIPTION OF THE DRAWINGS

The invention is described in greater detail hereinafter, by way of example only, with reference to the accompanying drawings, wherein.

DETAILED DESCRIPTION OF THE INVENTION

In a standard MPEG compliant video encoder, a sequence of moving pictures (e.g., video) is input to the encoder where it is compressed with a user defined target bitrate. The target bitrate is set according to the communication channel bandwidth in which the compressed video is to be transmitted, or the storage media capacity in which the compressed video sequence is to be stored. A typical MPEG encoder involves motion estimation/prediction, Inter/Intra classification, discrete cosine transform (DCT) computation, quantization, zig-zag scanning, variable length coding and rate-control.

Several different forms of coding can be employed depending upon the character of the input pictures, referred to as I-pictures, P-pictures, or B-pictures. The I-pictures are intra-coded pictures used mainly for random access or scene update. The P-pictures use forward motion predictive coding with reference to previously coded I- or P-pictures (anchor pictures), and the B-pictures use both forward and backward motion predictive/interpolative coding with reference to previously coded -or P-pictures. Furthermore, a group of pictures (GOP) is formed in encoded order starting with an I-picture and ending with the picture before the next I-picture in the sequence.

The pictures are partitioned into smaller and non-overlapping blocks of pixel data called macroblocks (MBs) before encoding. Each from a P- or B-picture is subjected to a motion estimation process in which forward motion vectors, and backward motion vectors in the case of a B-picture MB, are determined using reference pictures from a frame buffer. The target macroblock in the current picture is matched with a set of displaced macroblocks in the reference picture, the macroblock that best matches the target macroblock is used as the predicted macroblock. The position of this predicted macroblock is specified by a set of vectors known as motion vectors, which describe the vertical and horizontal displacement between the target and predicted macroblock. For a B-picture, the process is similar except there are two reference pictures: anchor pictures immediately preceding and following the B-picture.

With the determined motion vectors, motion compensation is performed where the intra- or inter-picture prediction mode of the MB is first determined according to the accuracy of the motion vectors found, followed by generating the necessary predicted MB. I-pictures are always intra coded while for P and B-pictures, a decision on whether intra or inter coding will be used (at macroblock level) is made depending on which method will give rise to a more efficient coding.

Transformation of the macroblock using a DCT is then carried out on the 8×8 pixel blocks within the macroblock. For intra coding, the actual picture data is coded, while for inter coding the prediction error is coded. This is followed by a quantization process of the DCT coefficients which involves a quantization matrix and a quantization step size. The quantized coefficients are then run-length encoded with variable length codes.

The resultant bit usage and statistical data are passed onto a rate control module, which is used for allocating a target number of bits used to encode each picture and each macroblock within the picture. This is an important module in the encoder as it plays a major role in maintaining the quality of the encoded picture.

The rate control in MPEG-2 Test Model 5 (TM5) comprises the steps of allocating the target amount of bits for coding each picture, deriving the reference quantization parameter ($Q_j$) to be used on each macroblock in a picture, and modulating the $Q_j$ based on the activity masking level of the surrounding blocks of the corresponding macroblock to obtain the modulated quantization step size (Mquant) used to quantize the macroblock.

An objective of this rate controller is to ensure all pictures maintain a similar level of quality. It assumes that the subjective quality of a single coded picture can be qualified with a single number V, described by factor K/Q where K is a constant particular to a picture type and Q is the quantization step size for the picture being coded. That is, the rate controller will try to preserve the following equation:

$$V = \frac{K_i}{Q_i} = \frac{K_p}{Q_p} = \frac{K_b}{Q_b}$$

The subscripts i, p, b refers to I, P, and B-picture types. The parameters $K_i$, $K_p$, and $K_b$ are experimentally determined constants for all I, P, and B pictures respectively, and $K_i$ usually is normalized to the value of 1.

Figure 1:
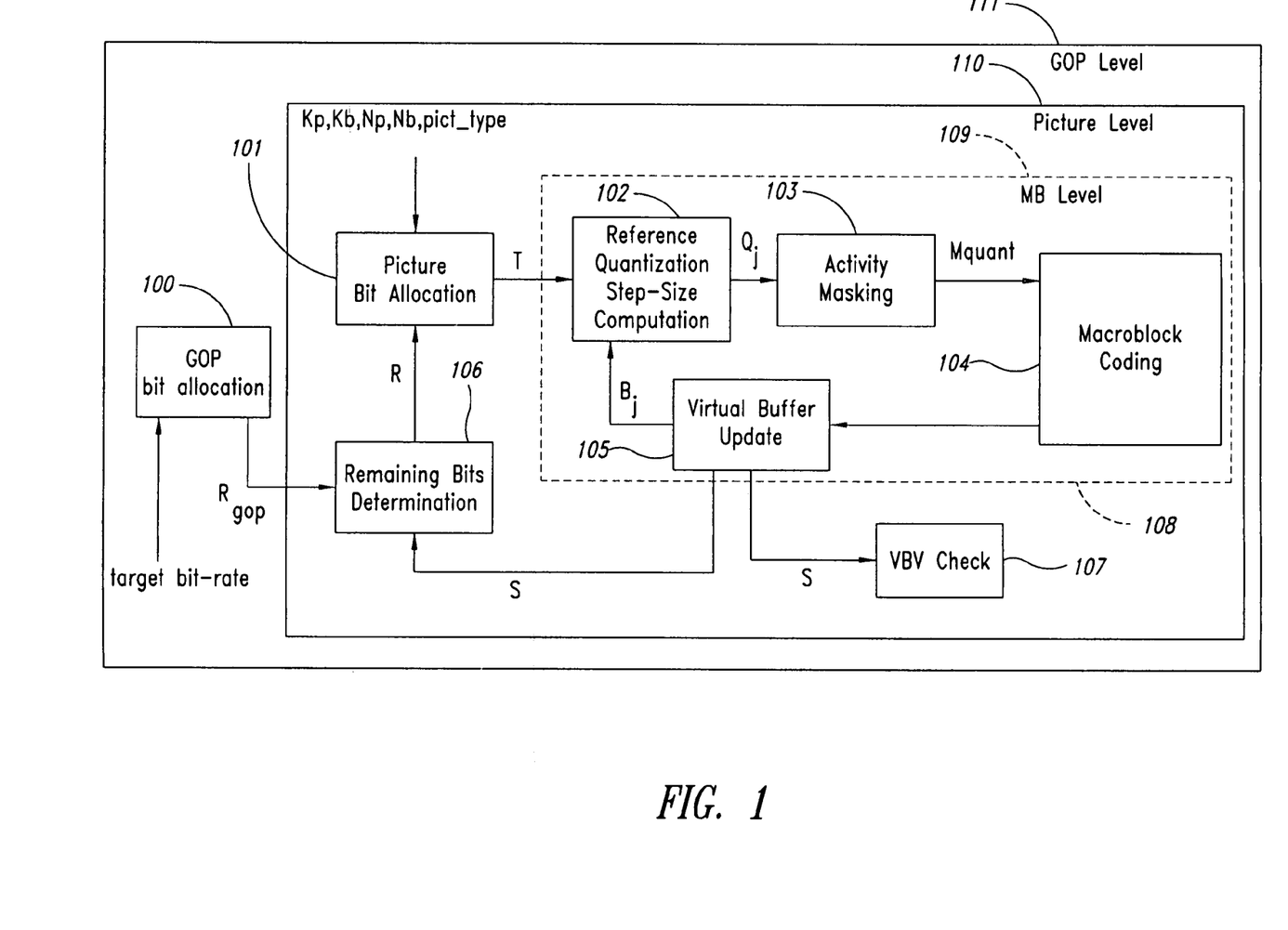
FIG. 1 is a block diagram of the constant bit-rate controller based on TM5.

FIG. 1 illustrates a block diagram of a known embodiment of the TM5 rate controller. A group-of-pictures (GOP) is a collection of one I picture, some P pictures and B pictures, and serves as a basic access unit with the I picture as the entry point to facilitate random access. The controller comprises three levels of processing: a GOP level 111, a picture level 110, and a macroblock (MB) level 109. At the start of every new GOP at the GOP level 111, a GOP bit allocation process 100 computes the total number of bits ($R_{gop}$) allocated for the GOP. The value of $R_{gop}$ is given by:

$$R_{gop} = \frac{\text{bit\_rate} \times N}{\text{picture\_rate}} \quad (1)$$

where
  bit_rate is the target bit rate for encoding the picture sequence,
  picture-rate is the number of pictures coded per second, and
  N is the total number of pictures coded in the GOP.

The remaining bits (R) for the GOP is determined at the picture level 110 by a remaining bits determination process 106. The value of R is updated as:
  R=R−S where S is the number of bits used by previously coded pictures in the GOP, and
  R=R+$R_{gop}$ for a new GOP.

With the computed value of R, a picture bit allocation process 101 at the picture level 110 then computes a target bit value (T) allocated to the current picture according to the equations below for corresponding I, P or B picture type:

$$T_i = \max\left[\frac{R}{1 + \frac{N_p X_p}{X_i K_b} + \frac{N_b X_b}{X_i K_b}}, \frac{\text{bit\_rate}}{K \times \text{picture\_rate}}\right] \quad (2)$$

-continued $$T_p = \max\left[\frac{R}{N_p + \frac{N_b K_p X_b}{X_p K_b}}, \frac{\text{bit\_rate}}{K \times \text{picture\_rate}}\right] \quad (3)$$

$$T_b = \max\left[\frac{R}{N_b + \frac{N_p K_b X_p}{X_b K_p}}, \frac{\text{bit\_rate}}{K \times \text{picture\_rate}}\right] \quad (4)$$

where $T_i$, $T_p$, $T_b$ Represents target bits for the next picture (I, P, B)

$N_b$, $N_p$ Represents the remaining number of pictures (P, B) in the GOP $X_i$, $X_p$, $X_b$ Represents global complexity measures and gives a measure of the actual number of bits required to represent the picture (without compression), and $X_i = Q_i \times S_i$ $X_p = Q_p \times S_p$ $X_b = Q_b \times S_b$ $S_i$, $S_p$, $S_b$ are the actual number of bits used to code the previous I/P/B frame.

K s a constant (e.g., 8)

After computing the target bits for the picture, a reference quantization step-size ($Q_j$) computation 102 is carried out at the MB level 109 for each macroblock within the picture. The value of $Q_j$ is computed based on the determined target bit allocation ($T_i$, $T_p$, or $T_b$) and a buffer fullness value ($d_j$). Each of the three picture types has a virtual buffer associated with it and these buffers are updated after coding each macro block of the picture type according to the following equations:

$$d_j^i = d_0^i + B_{j-1} - \frac{T_i \times (j-1)}{\text{MB\_Cnt}} \quad (5)$$

$$d_j^p = d_0^p + B_{j-1} - \frac{T_p \times (j-1)}{\text{MB\_Cnt}} \quad (6)$$

$$d_j^b = d_0^b + B_{j-1} - \frac{T_b \times (j-1)}{\text{MB\_Cnt}} \quad (7)$$

where $d_0$ is the initial virtual buffer fullness, $d_j$ is the virtual buffer fullness when coding $j^{th}$ MB, $B_{j-1}$ is the actual bits consumed up to and including $(j-1)^{th}$ MB as provided by a virtual buffer update process 105, and MB_Cnt is the number of MBs in the picture.

Equations (5) to (7) effectively track the differences between the actual number of bits used and the target bits allocated, and these differences are then added to the respective virtual buffers which are used to compute $Q_j$. This allows the rate controller to control the bits allocation based on the consumption pattern of the picture $Q_j$ is computed from the buffer fullness via the equation:

$$Q_j = (d_j \times 31)/r = d_j \times \text{constant} \quad (8)$$

where r is a reaction parameter=2×bit_rate/picture_rate

Figure 2:
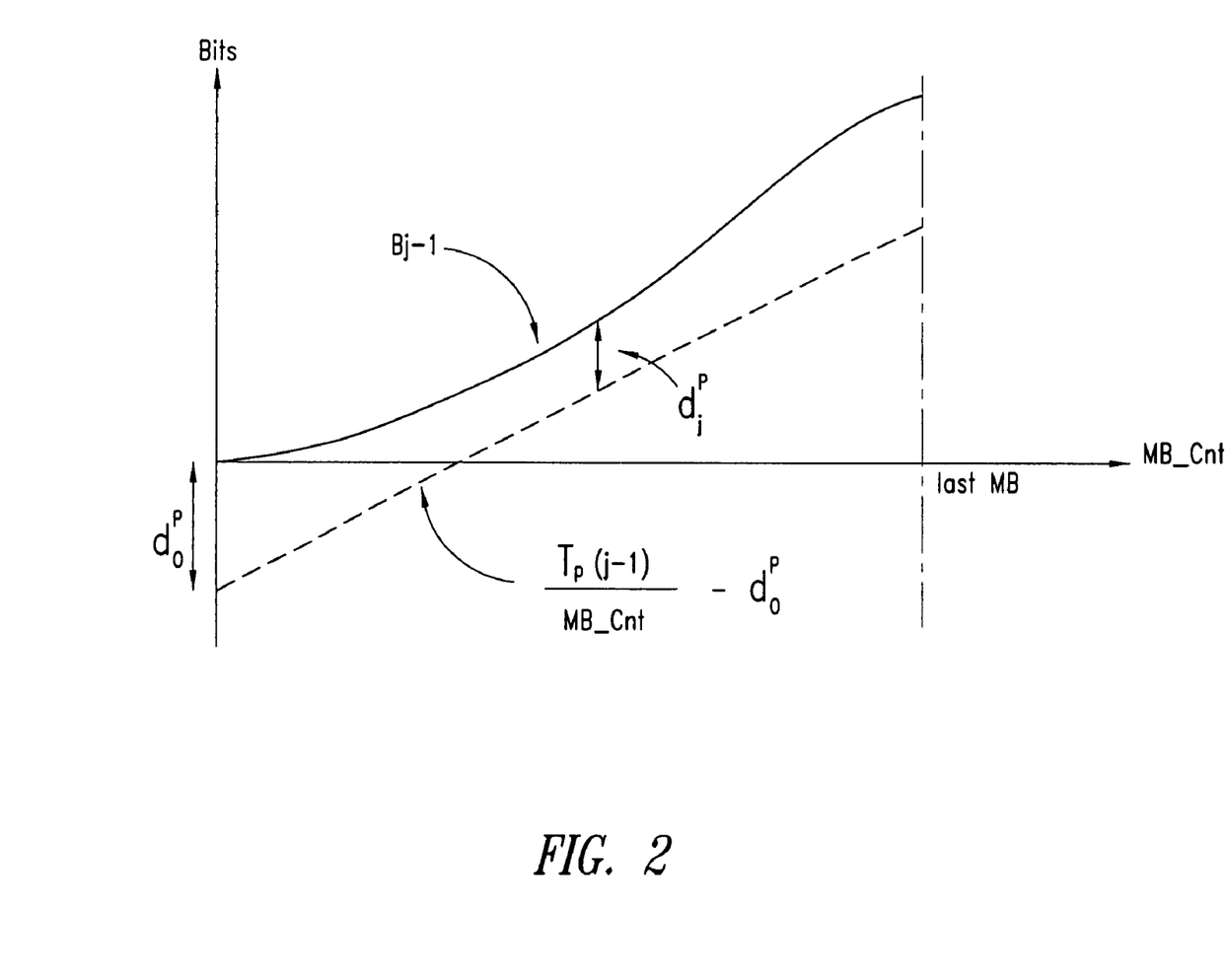
FIG. 2 illustrates the difference between a target bit allocation and an actual bits consumption at macroblock level for one frame (a P-picture is chosen for this case), where $d_j$ is the virtual buffer fullness at a particular instance.

The reaction parameter, as the name implies, is a factor that can control the sensitivity of the algorithm from a change $d_j$. Large r will cause the reaction to be slower, which may cause the target bits and actual bits to differ significantly, but it brings about a more gradual rate of change in bit consumption which is favorable for scene changes. On the other hand, a small r causes the controller to be more reactive to changes, giving rise to a closer target and actual bits value, but a faster response also means a less gradual change during scene change which is not desirable. A graph illustrating the difference between the target bit allocation and the actual bits allocated within a frame is shown in FIG. 2.

The value of $Q_j$ is further modified by an activity masking process 103 to give the modulated quantization step size, Mquant. Basically, the spatial masking ability of the macroblock is used to place a correction factor onto the computed $Q_j$ value. Spatial masking ability is the ability to contain noise masked from human visual systems. Typically, an area with complex texture will have a larger correction factor than an area with simple texture, hence, $$M\text{quant} = N\_act_j \times Q_j \quad (9)$$

where $N\_act_j$, is the normalize value of macroblock activity level and may have a value of between 0.5 and 2

With the computed Mquant, the macroblock coding process 104 is performed where the macro block is compressed according to the MPEG standards.

At the end of coding a picture, the bit count S used for coding the picture is used to perform a VBV check 107 and to compute the remaining bits R for the current GOP at the remaining bits determination process 106. The VBV (video buffer verifier) is a virtual buffer emulating the status of the decoding buffer. The VBV check (107) is performed to detect any overflow or underflow of the decoding buffer with reference to the target bit rate.

When coding a picture sequence with varying scene complexity, a constant bit rate (CBR) encoder is unable to vary the bit-rate according to the scene complexity. This results in scenarios whereby simple scenes are allocated more bits than required while complex scenes are allocated insufficient bits, and therefore results in a variation of output visual quality between scenes of different complexities.

Figure 3:
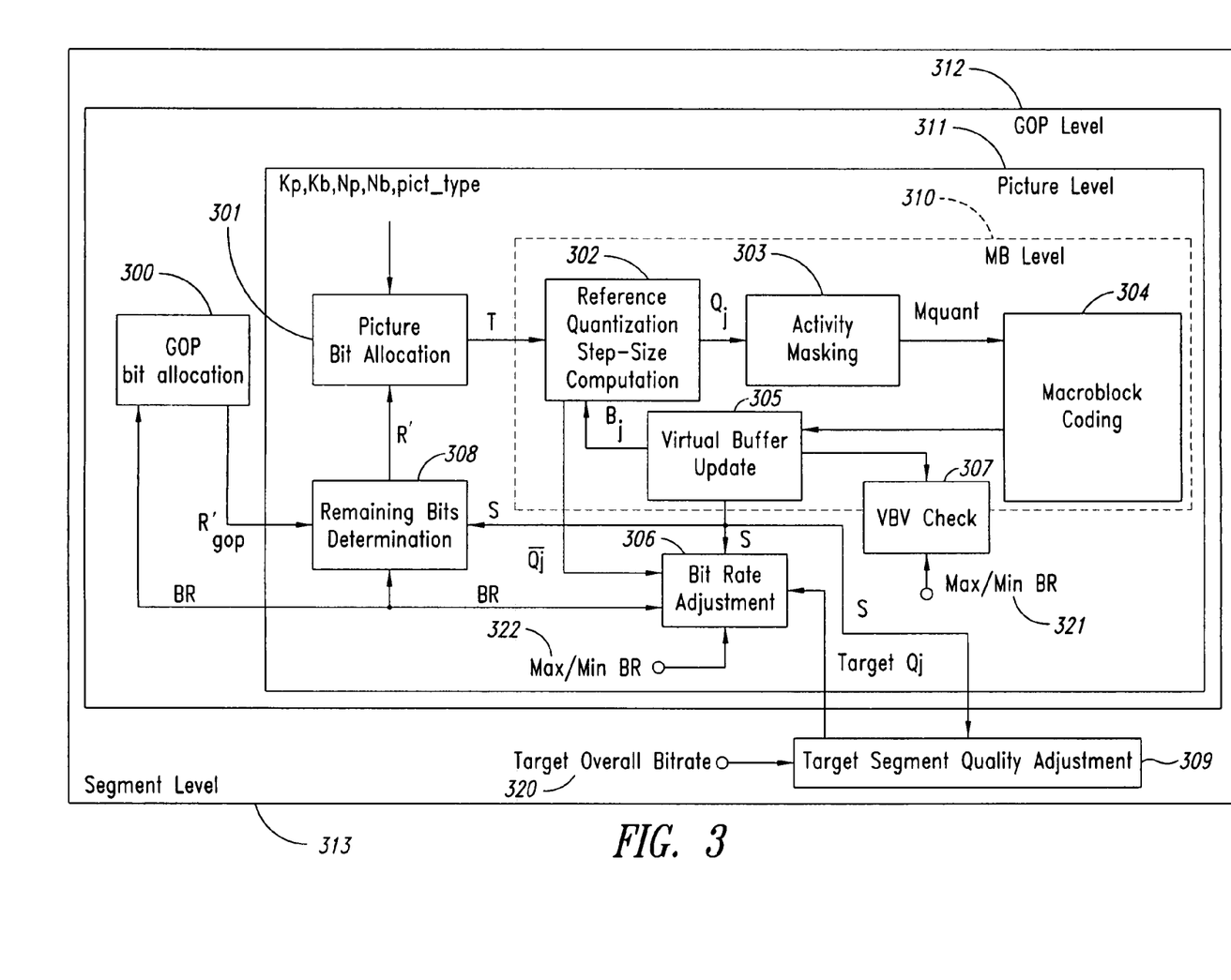
FIG. 3 is a block diagram of the variable bit-rate encoder with constant overall bit-rate control.

An embodiment of a moving pictures encoding apparatus according to the present invention is illustrated in block diagram form in FIG. 3. The encoding apparatus as illustrated is arranged in four levels corresponding to processing stages in the bit rate control process, namely a segment level 313, a GOP level 312, a picture level 311 and a macroblock (MB) level 310. An input moving pictures sequence is encoded in such a way that on the average, or at the end of encoding, the output bit rate is close to a user definable target overall bit rate (overall_BR) 320. The input sequence is divided into segments and groups of pictures (GOP). The purpose of a segment is for monitoring of output bit rate with reference to the overall_BR, and the purpose of the GOP is primarily to facilitate random access. A segment may be defined to include a number of GOP(s) depending on the need in terms of frequency of monitoring output bit rate. Each GOP comprises at least an I-picture and optionally one or more P-pictures and/or B-pictures. Each picture is divided into macroblocks of pixels for encoding. Hence, a method of rate control according to the current invention may contain processes at the segment level 313, GOP level 312, picture level 311, and finally macroblock level 310.

With a new group of pictures, a GOP bit allocation processor 300 computes the number of bits allocated to the current GOP($R'_{gop}$) as follows:

$$R'_{gop} = BR \times \frac{N_{gop}}{\text{picture\_rate}} \qquad (10)$$

where:

$N_{gop}$ is the number of pictures in the GOP, picture_rate is the number of pictures coded per second, and BR is a target bit rate.

The target bit rate BR is determined for each picture or plurality of pictures by a bit rate adjustment processor 306 which is described hereinbelow. A remaining number of bits (R') for the GOP is determined at the picture level 311 by a remaining bits determination processor 308, which carries out the steps of:

(a) before encoding the first picture in a GOP, adjusting R' with a new R'gop:

$R'+=R'_{gop}$, and then set $BR_{old}=BR$ (b) otherwise if the picture to be coded is not the first picture of a GOP, and a new target bit rate BR is determined, then adjusting R' with the new BR according to:

$$R' += \frac{N}{\text{picture\_rate}} \times (BR - BR_{old}), \text{ and then set } BR_{old} = BR$$

where N is remaining number of pictures in the current GOP (c) and removing number of bits used by the last coded picture S from the remaining bits value R', hence:

$R'=R'-S$

The computed R' is then passed to a picture bit allocation processor 301 to compute the target bit (7) allocated to a current picture to be coded. For example, equations (2), (3) and (4) described hereinabove may be used for that purpose, with the parameters $K_p$, $K_b$, $N_p$, $N_b$ and pict_type being supplied. Note that the lower limit of bit_rate (8*picture_rate) is only optional and may be adjusted if necessary.

At the macroblock (MB) level 310, a reference quantization step-size computation processor 302 computes a reference quantization step-size $Q_j$ for each MB using the computed target bit allocation T and a bit utilization parameter B determined by a virtual buffer update processor 305. An example of a method for computing $Q_j$ for the $j^{th}$ MB of the current picture is represented by:

$$Q_j = \frac{K_1 \times D_j \times \text{picture\_rate}}{K_2 \times BR} \qquad (11)$$

where $K_1$ and $K_2$ are constants (e.g., 31 and 2 respectively),

BR is the determined target bit rate, picture_rate is the number of coded pictures per second, and $D_j$ is a virtual buffer fullness The virtual buffer fullness of the $j^{th}$ MB is determined by:

$$Q_j = \frac{K_1 \times D_j \times \text{picture\_rate}}{K_2 \times BR} \qquad (12)$$

where $D_0$ is an initial buffer fullness before coding the current picture, i.e., $D_j$ at end of the previous picture, B is the bit utilization information supplied by the virtual buffer update processor 305, i.e., bits used to code the $1^{st}$ MB to $(j-k_3)^{th}$ MB, MB_Cnt is the total number of MB in the current picture, and $K_3$ is a constant (e.g., 1).

Three independent current and initial virtual buffers fullness values ($D_j^i$, $D_j^p$, $D_j^b$, $D_0^i$, $D_0^p$, $D_0^b$) may be maintained for the three picture types (I-pictures, P-pictures, and B-pictures). The computed $Q_j$ may also be further scaled by an activity masking processor 303 according to a masking factor determined by the surrounding activity levels of the MB to form the final quantization step-size, Mquant, for coding the current MB. A method of masking factor determination can be found in the aforementioned MPEG-2TM5.

Macroblock coding (304) is then performed to encode the current MB. A macroblock coding processor 304 may employ, for example, methods according to the MPEG-1 or MPEG-2 video encoding standards. Such encoding methods include necessary motion compensation, discrete cosine transform, quantization with the determined quantization step-size, and run-length encoding with variable length codes. The methods also include necessary decoding processes such that motion compensation can be performed. The number of bits utilized by the macroblock coding processor 304 to code each MB is passed to the virtual buffer update processor 305.

In applications where a maximum and/or minimum bit rate must be maintained for encoding, a VBV checking processor 307 is utilized. User definable maximum and/or minimum bit rates (max/min BR) are input at 321 to the VBV checker 307, a method of VBV checking according to the MPEG standards is used to examine bit utilization information from the virtual buffer 305, and necessary corrections are made to ensure compliance and that the output bit rate is within the defined max/min BR.

At the end of coding a picture or a plurality of pictures, bit rate adjustment is applied by the bit rate adjustment processor 306 to provide any necessary correction to the current target bit rate BR. The correction is based on a target encoding quality provided by a target segment quality adjustment processor 309 and a resultant encoding quality of previously coded picture(s) such that the overall encoding qualities of pictures within a segment are relatively close to the target constant. The resultant encoding quality may be determined by the average value of the reference quantization step size (i.e., average $Q_j$) of the previously coded picture(s). A method of target bit rate (BR) determination can be derived from a rate-quantization model as given by:

$$BR = \text{current\_BR} + \frac{K_4 \times (\text{average\_Q}_j - \text{target\_Q}_j)}{\text{average\_Q}_j} \qquad (13)$$

where
    current_BR is a current estimated bit rate, or $$current\_BR = S_i \div N_p \times S_p + N_b \times S_b,$$

$S_i$, $S_p$, $S_b$ are bits used by previously coded I, P, and B-pictures respectively, $N_p$, $N_b$ are total number of P and B-pictures in the current GOP, average_$Q_j$ is the average value of $Q_j$ of previously coded picture(s)

target_$Q_j$ is the target encoding quality or target value of $Q_j$, $K_4$ may be a constant, or a factor of previous BR, max_BR, or current_BR, and K, may also be separately determined for I, P, and B-picture types.

Maximum and/or minimum bit rates can be applied to the determined BR according to application requirements. The max/min BR input at 322 are used as given by:

if $(BR > max\_BR)$, then $BR = max\_BR$ if $(BR > min\_BR)$, then $BR = min\_BR$ It is also possible to make use of the target_$Q_j$ at the macroblock level to increase efficiency of encoding. Basically, the target_$Q_j$ is used by the reference quantization step-size computation processor 302 as a lower limit of the output reference quantization step-size $Q_j$ such that when this target (quality) is reached at the MB level, bits are saved for future encoding immediately. In this case, the output reference quantization step size may be set according to:

if $(Q_j < target\_Q_j)$, then $Q_j = target\_Q_j$.

The target bit rate BR is adjusted continuously with reference to a fixed target encoding quality within each segment. In turn at the beginning of each segment, the target encoding quality is adjusted so that a target overall bit rate is achieved. A segment may contain a few groups of pictures depending on the need in terms of frequency of monitoring output bit rate. A new segment may also be defined by a scene change detectable by any conventional scene change detector with a given range of time.

At the onset of a new segment, the target segment quality adjustment processor 309 executes a check on the overall bit-rate based on bits usage and makes any necessary adjustments to the target encoding quality for the bit rate adjustment processor 306 so that the overall bit-rate converges to a user definable target overall bit-rate 320 (overall_BR).

Figure 4:
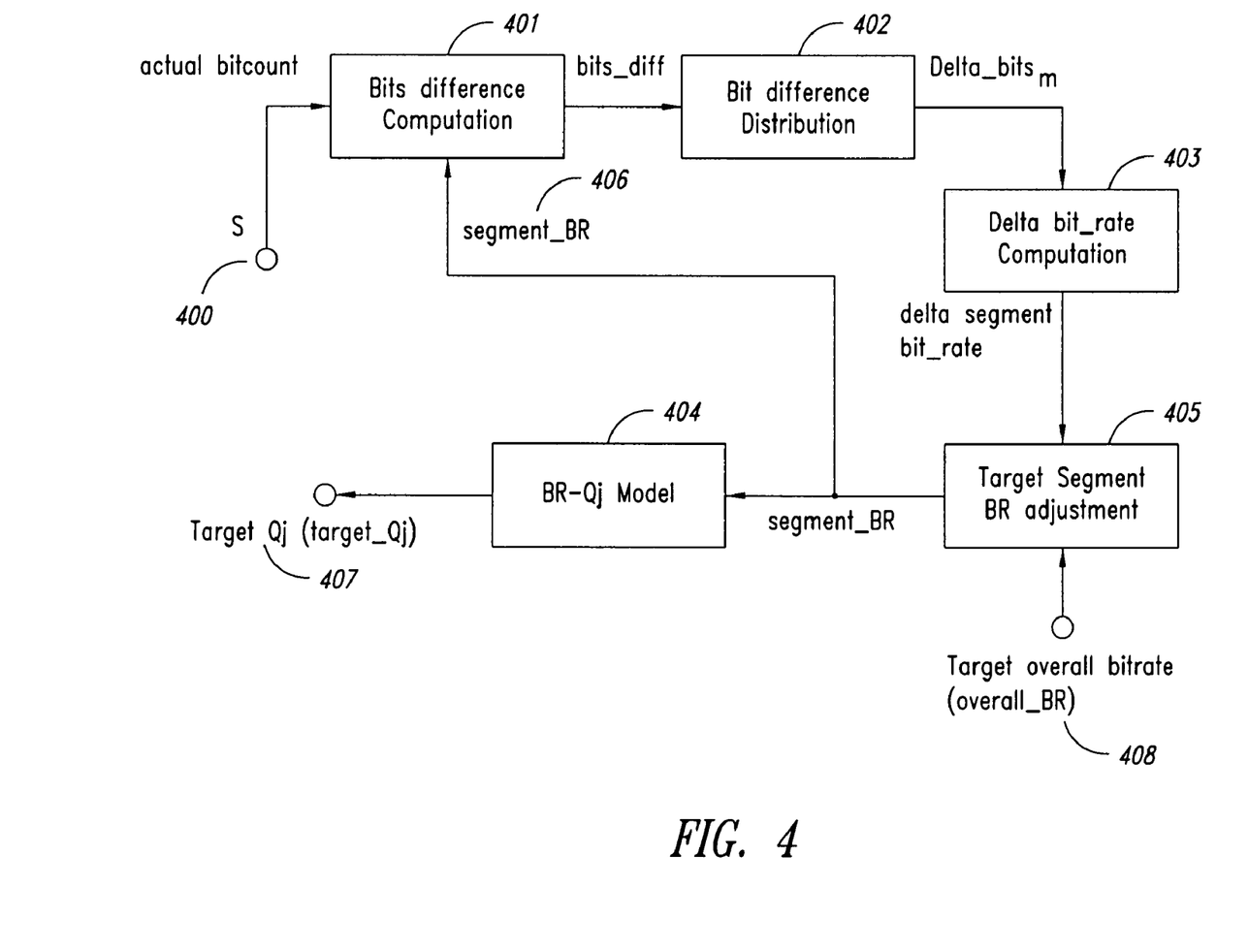
FIG. 4 is a block diagram of the constant overall bit-rate controller.

An example embodiment of a constant overall bit rate controller implementing the target segment quality adjustment process according to the present invention is illustrated in block diagram form in FIG. 4. The bit count difference between the actual and target bit counts (bits_diff) for coding of a previous segment is calculated by a bits difference computation processor 401, utilizing the steps of:

a) obtaining the actual bits (bits_segment) used for coding the previous segment according to the input bit utilization of pictures (S) 400 in the previous segment, and b) computing the value of bits_diff based on a corresponding target segment bit rate 406 (segment_BR) for the previous segment, according to:

$$bits\_diff = \frac{segment\_BR \times N_{segment}}{picture\_rate} - bits\_segment \quad (14)$$

where $N_{segment}$ is the number of coded pictures in the previous segment.

The bit count difference(bits_diff) is then redistributed by a bit difference distribution processor 402 over the next k number of segments using a bit distribution function, $f(m)$, expressed as:

$$delta\_bits_m = f(m) \times bits\_diff$$

where
    $m = 1, \ldots, k$,
    $\Sigma^k f(m) = 1$
    delta_bits$_m$ is the bits difference distributed to next $m^{th}$ segment.

Figure 5:
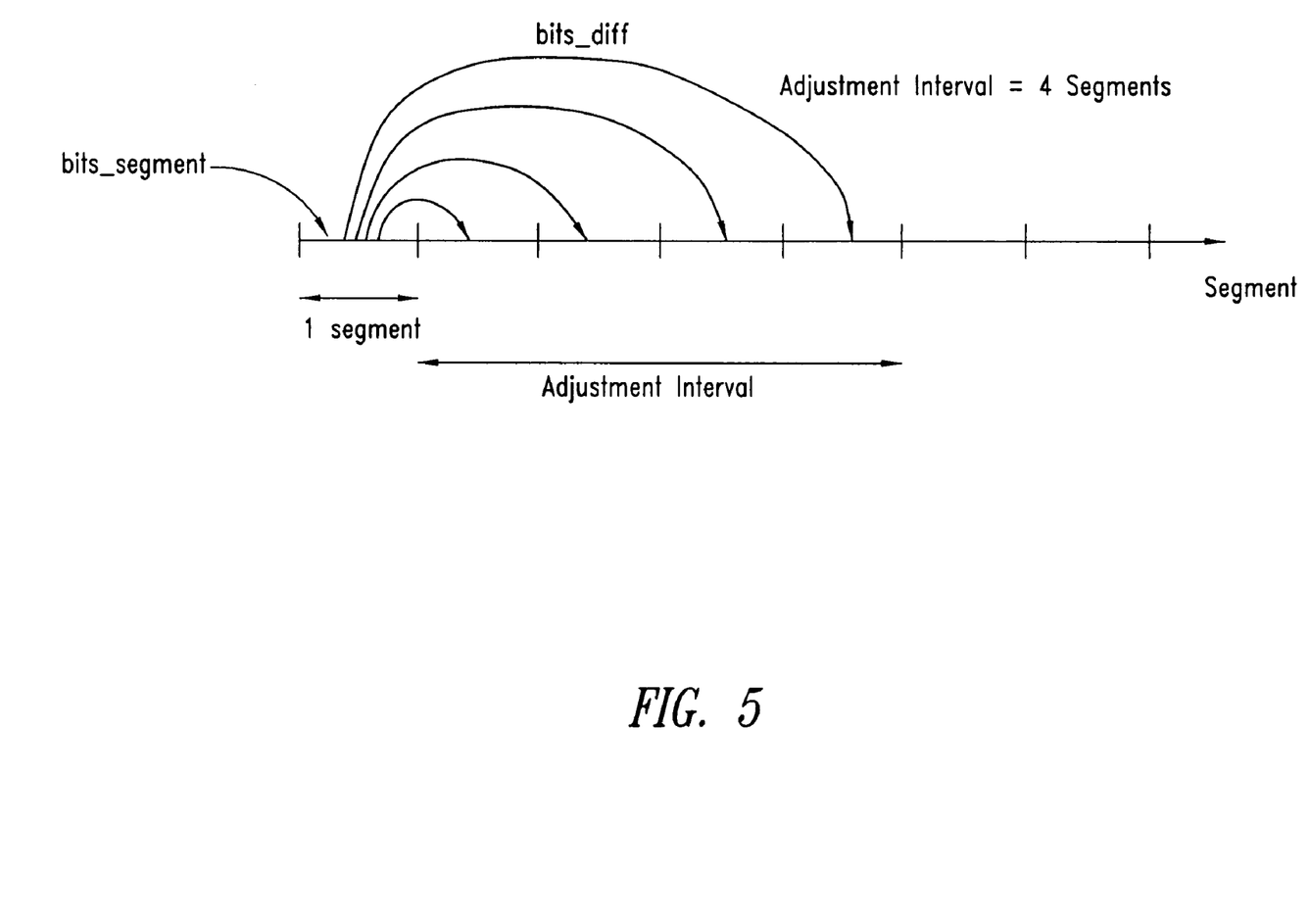
FIG. 5 illustrates how the difference in bit count for the last segment is redistributed over the next four segments (e.g., f(m)=¼)

For an example case of $k=4$ and $f(m)=1/k$, FIG. 5 illustrates how the bit count difference (bits_diff) of an encoded segment is distributed over the next 4 segments. The period of k segments used for bits compensation is referred to as an adjustment interval. A delta bit-rate computation processor 403 (FIG. 4) accumulates all bit differences (delta_bits) distributed from previously encoded segments to the current segment to be coded, and computes a delta segment bit-rate (Δsegment_BR) based on the accumulated delta_bits and the number of pictures in the current segment to be coded. The delta segment bit-rate and a user definable target overall bit-rate (overall_BR) input at 408 are used by the target segment BR adjustment processor 405 to derive the target segment bit rate (segment_BR) 406 for the current segment. The value of segment_BR can be expressed as:

$$segmenet\_BR = overall\_BR \div \Delta segment\_BR \quad (16)$$

A new target encoding quality (target_$Q_j$) 407 for encoding of the current segment is then determined from the target segment bit rate using a BR-Qj modeling processor 404. The BR-Qj modeling processor may operate, for example, according to:

$$\Delta Q_j = target\_Q'_j \times \frac{(segmenet\_BR - segment\_BR')}{K_5 \times segment\_BR'} \quad (17)$$

$$target\_Q_j = target\_Q'_j + \Delta Q_j$$

where
    target_$Q'_j$ is the target $Q_j$ of the previous segment,
    segment_BR' is the target segment bit rate of the previous segments, and
    $K_5$ is a constant which can be experimentally determined.

A maximum limit may be placed on the determined $\Delta Q_j$ so that there is no drastic change in output quality from one segment to another.

Figure 6:
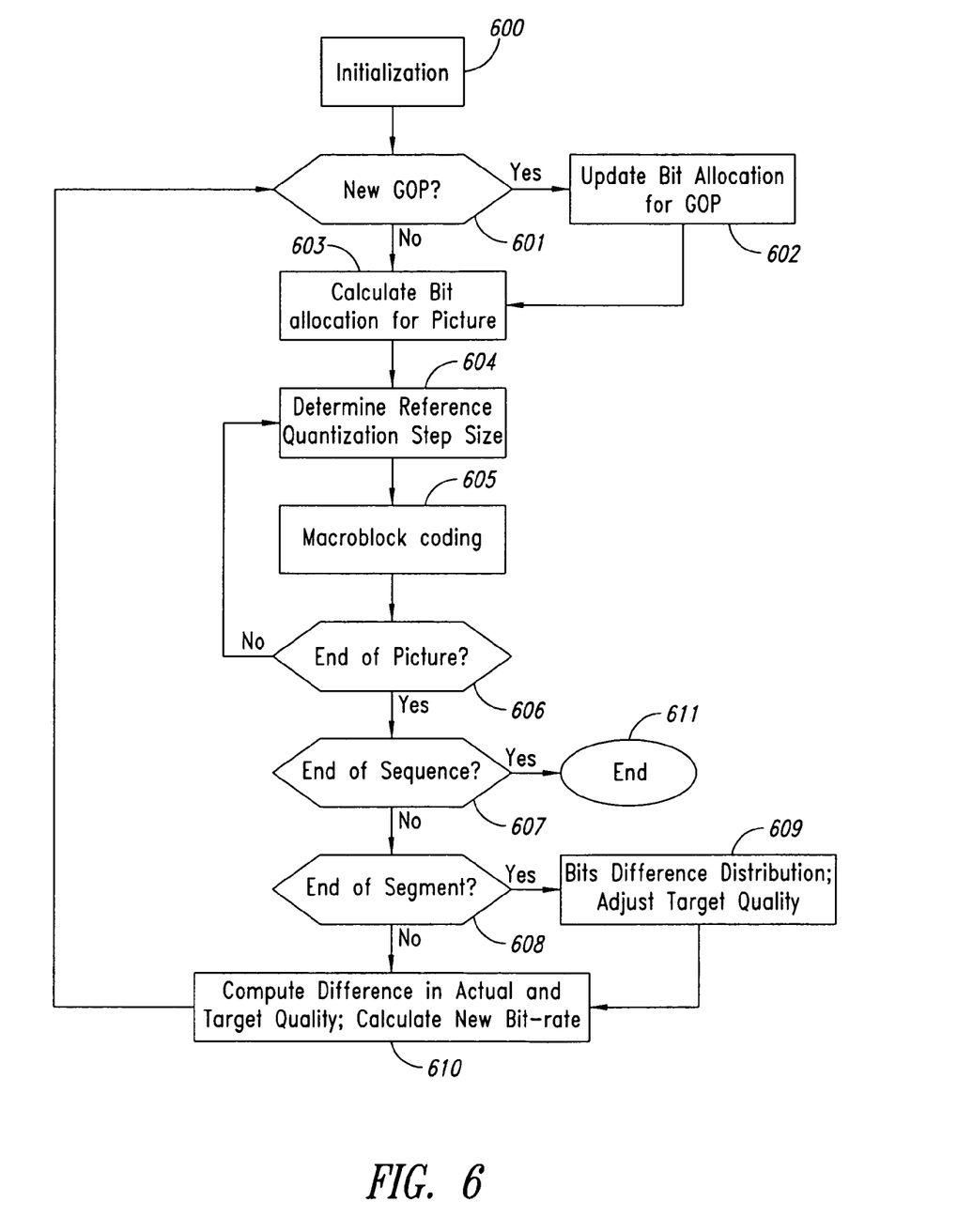
FIG. 6 is a flow chart of a VBR algorithm with constant overall bit-rate control.

A flow chart for a process of variable bit rate (VBR) encoding with constant overall bit rate control according to an embodiment of the invention is illustrated in FIG. 6. Initialization of predetermined parameters is first carried out at step 600. Then, at step 601 the process determines whether processing is at the start of a new group-of-pictures (GOP) or not. Where a new GOP is determined, step 602 is carried out by updating the bit allocation for the new GOP. This may involve, for example, computation of the GOP bit allocation R'$_{gop}$ according to Equation (10) described hereinabove and accumulating to the remaining bit value R' to give the R' for the new GOP.

For each picture in the current GOP, a target bit allocation value T is determined at step 603, and this may be computed according to Equations (2), (3) and (4), for example. Then, for each macroblock in the picture, a reference quantization step size Q is determined using the computed target bit allocation T, such as by the process represented by Equations (11) and (12). Activity masking may also be included in this step. The macroblock of the picture is then encoded at step 605 using the computed quantization step size, and steps 604 and 605 are repeated for all of the macroblocks in the picture until the end of the picture is determined at step 606.

When the end of the sequence of moving pictures which is being encoded is reached, this is determined at step 607, which terminates the process at step 611 upon that occurrence. Otherwise, the process continues to step 608 where it is determined whether the end of the current segment of pictures has been reached.

When the end of a segment of pictures is reached and processing of a new segment about to begin, the target encoding quality is adjusted at step 609. This is performed by firstly computing the difference between the number of bits allocated for coding the previous segment and the actual number of bits used in coding that segment, such as by the process represented by Equation (14). This quantity, bits_diff, represents extra bits which are left over from the previous segment of pictures, and may be distributed for use in encoding the ensuing picture segments. The left over bits bits_diff are distributed for use over one or more segments according to a bit distribution function, an example of which is described in connection with Equation (15). In essence, the left over bits from the previous segment are divided into a plurality of k, preferably equal, amounts and allocated to the following k segments for encoding with. The dividends allocated from all of the k previously processed segments are accumulated and used to determine a change in segment bit rate, $\Delta$segment_BR, according to the accumulated bits difference and the number of pictures in the segment to be coded. This can then be used to compute an allocated bit rate for the segment to be coded according to Equation (16). Finally, a target encoding quality, target_$Q_j$, can be computed according to Equations (17) and (18), for example.

If the end of a segment has not been reached at step 608, or after the target quality adjustment of step 609, the target quality and the actual quality of encoded pictures is compared, and a new bit rate for encoding the next picture is computed based on the difference. This step can be carried out as described in relation to Equation (13), for example. The procedure then returns to step 601, described above.

In summary, embodiments of the present invention provide methods and apparatus for encoding moving pictures with a variable bit rate whilst maintaining a consistent output encoding quality according to a determined target quality. The target quality is adjusted at the beginning of every moving pictures segment according to a bit distribution function to ensure an overall bit rate that meets a defined target. Furthermore, the segment based bit distribution function provides smooth and flexible modulation of the encoding quality. The method can be implemented at low cost and with the ability to encode an input moving pictures sequence in one-pass at real-time.

It will be readily apparent to those of ordinary skill in the art that the foregoing detailed description of the present invention has been presented by way of example only, and is not intended to be considered limiting to the invention as defined in the claims appended hereto. In particular, it is envisaged that numerous variations to the embodiments as described can be made without departing from the spirit and scope of the invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

| GLOSSARY | |
|---|---|
| VBV | video buffer verifier |
| VBR | variable bit rate |
| CBR | constant bit rate |
| MPEG | Moving Picture Experts Group |
| DCT | discrete cosine transform |
| GOP | group of pictures |
| MB | macroblock |
| Q | quantisation parameter (picture quality) |
| $Q_j$ | quantisation parameter for macroblock j |
| $Q_i, Q_b, Q_p$ | quantisation parameters for I, B and P type pictures |
| $R_{gop}$ | number of bits allocated for encoding a group of pictures |
| bit_rate | target bit rate for a picture sequence |
| picture_rate | number of pictures coded per second |
| N | total number of pictures in the group of pictures |
| $N_b, N_p$ | remaining number of P, B pictures in the group of pictures |
| R, R' | remaining number of bits for encoding a group of pictures |
| S | number of bits already used in coding a group of pictures |
| $T_i, T_p, T_b$ | target number of bits for coding next I, P, B type picture |
| $X_i, X, X_b$ | global complexity measures for I, P, B type pictured |
| $d_j$, Dj | virtual buffer fullness when coding the $j^{th}$ macroblock |
| $d_0, D_0$ | initial virtual buffer fullness |
| $B_{j-1}$ | actual bits used up to and including $(j-1)^{th}$ macroblock |
| MB_Cnt | number of macroblocks in the picture |
| r | reaction parameter (= 2 × bit_rate/picture_rate) |
| N_$act_j$ | normalised macroblock activity level |
| Mquant | modulated quantisation step size (= N_$act_j$ × $Q_j$) |
| overall_BR | definable target overall bit rate |
| BR | target bit rate |

The invention claimed is:

1. A method for use in a moving pictures encoder for encoding a sequence of segments each having a plurality of pictures, each picture including a plurality of macroblocks, the method comprising the steps of:

a) defining an overall target bit rate for encoding the sequence of segments;

b) determining a bit allocation and target quantization step size for encoding a first segment of the sequence of segments based on a segment target bit rate calculated using said overall target bit rate;

c) encoding said first segment using a variable bit rate encoding method according to the target quantization step size;

d) determining a difference between the number of bits used to encode said first segment and said first segment bit allocation;

e) distributing said difference for use in encoding at least one subsequent segment to determine a subsequent segment bit allocation;

f) determining a new target quantization step size for encoding said subsequent segment on the basis of a new target segment bit rate calculated using said segment target bit rate and the distributed difference; and g) encoding said subsequent segment using a variable bit rate encoding method according to the new target quantization step size,
wherein variable bit rate encoding is employed for encoding pictures within a segment whilst maintaining a substantially constant bit rate over said sequence.

2. A method as claimed in claim 1, wherein the steps d) to g) are carried out iteratively using the number of bits used to encode the subsequent segment and the subsequent segment bit allocation for determining said difference.

3. A method as claimed in claim 1, wherein each segment comprises at least one group of pictures having an I-picture.

4. A method as claimed in claim 3, wherein the at least one group of pictures further has at least one P picture and/or at least one B picture.

5. A method as claimed in claim 4, wherein said difference is distributed according to:

$$\text{delta\_bits}_m = f(m) \times \text{bits\_diff}$$

where delta_bits$_m$ is the bits difference distributed to next m$^{th}$ segment in the sequence,
m=1, . . . , k
k is a positive integer,
$f(m)$ is a bit distribution function, wherein $\Sigma^k f(m)=1$, and
bits_diff is the difference between the number of bits used to encode the first segment and said first segment bit allocation.

6. A method as claimed in claim 5, where $f(m)=1/k$.

7. A method as claimed in claim 5, wherein the steps d) to g) are carried out iteratively using the number of bits used to encode the subsequent segment and the subsequent segment bit allocation for determining said difference.

8. A method as claimed in claim 7, wherein the at least one group of pictures further has at least one P picture and/or at least one B picture.

9. A method as claimed in claim 1, wherein the new target quantization step size is calculated according to:

$$\Delta Q = \text{target\_Q}' \times \frac{(\text{segment\_BR} - \text{segment\_BR}')}{K \times \text{segment\_BR}'}$$

$$\text{target\_Q} = \text{target\_Q}' + \Delta Q$$

where target_Q is the new target quantization step size,
segment_BR is the new target bit rate,
target_Q' is the target quantization step size of the preceding segment,
segment_BR' is the target segment bit rate of the preceding segment, and
K is a constant.

10. A method as claimed in claim 9, wherein for each subsequent segment the difference between the number of bits used to encode the segment and the segment bit allocation is determined according to:

$$\text{bits\_diff} = \frac{\text{segment\_BR} \times N_{segment}}{\text{picture\_rate}} - \text{bits\_segment}$$

where:
bits_diff is said difference,
segment_BR is the segment target bit rate,
N$_{segment}$ is the number of coded images in the segment, and
bits_segment is the actual number of bits used to encode the segment.

11. A method as claimed in claim 10, wherein said difference is distributed according to:

$$\text{delta\_bits}_m = f(m) \times \text{bits\_diff}$$

where delta_bits$_m$ is the bits difference distributed to the next m$^{th}$ segment in the sequence,
m=1, . . . , k,
k is a positive integer, and
$f(m)$ is a bit distribution function, where $\Sigma^k f(m)=1$.

12. A method as claimed in claim 11, where $f(m)=1/k$.

13. A method for encoding moving pictures in a moving pictures encoder wherein a sequence of images are provided as input, the sequence of images comprising a plurality of segments each having a plurality of images, the method including:
a) defining an overall target bit rate for encoding the sequence of images;
b) maintaining a distribution record of bits from at least one previously encoded segment allocated for use in encoding at least one segment to be encoded;
c) determining a target segment bit rate for a segment of the sequence of images on the basis of the overall target bit rate and a bit rate change calculated from the corresponding allocated bits from the distribution record;
d) determining a target segment encoding quality from the target segment bit rate, a preceding target segment bit rate and a preceding target segment encoding quality; and
e) encoding the images of the segment according to the target segment encoding quality using a variable bit rate encoding technique taking into account scene complexities of the images in the segment,
wherein maintaining said distribution record includes determining a difference between the number of bits used to encode a particular segment and the number of bits allocated for encoding the particular segment on the basis of the target segment encoding quality.

14. A method as claimed in claim 13, wherein steps b) to e) are carried out iteratively for said sequence of images.

15. A method as claimed in claim 14, wherein each segment comprises at least one group of pictures having an I-picture.

16. A method as claimed in claim 13, wherein the difference between the number of bits used to encode a particular segment and the number of bits allocated for encoding the particular segment is determined according to:

$$\text{bits\_diff} = \frac{\text{segment\_BR} \times N_{segment}}{\text{picture\_rate}} - \text{bits\_segment}$$

where:
bits_diff is said difference,
segment_BR is the segment target bit rate,
N$_{segment}$ is the number of coded images in the segment, and
bits_segment is the actual number of bits used to encode the segment.

17. A method as claimed in claim 16, wherein the allocation of bits in the distribution record is calculated according to:

$$\text{delta\_bits}_m = f(m) \times \text{bits\_diff}$$

where delta_bits$_m$ is the bits difference allocated to next m$^{th}$ segment in the sequence,
m=1, . . . , k,
k is a positive integer, and
$f(m)$ is a bit distribution function, where $\Sigma^k f(m)=1$.

18. A method as claimed in claim 17, where $f(m)=1/k$.

19. A method for controlling bit allocation in a moving pictures encoder for encoding a sequence of images comprising a plurality of segments each having a plurality of images, the method including, for each segment:
determining a difference between a number of bits used for encoding a previous segment and a number of bits allocated for encoding the previous segment;
calculating a bits distribution from the determined bits difference and a predetermined distribution function;
calculating a bit rate change from the bits distribution and a predetermined number of images in the segment;
calculating a target segment bit rate from the bit rate change and a predetermined target overall bit rate for the sequence of images; and
determining a target segment encoding quality from the target segment bit rate.

20. A method as claimed in claim 19, wherein the bits distribution is calculated according to:

$$\text{delta\_bits}_m = f(m) \times \text{bits\_diff}$$

where delta_bits$_m$ is the number of bits difference allocated to next m$^{th}$ segment in the sequence,
m=1, ..., k,
k is a positive integer, and
$f(m)$ is a bit distribution function, where $\Sigma^k f(m)=1$.

21. A method as claimed in claim 20, where $f(m)=1/k$.

22. A method as claimed in claim 20, wherein the target segment encoding quality is calculated according to:

$$\Delta Q = \text{target\_Q}' \times \frac{(\text{segment\_BR} - \text{segment\_BR}')}{K \times \text{segment\_BR}'}$$

$$\text{target\_Q} = \text{target\_Q}' + \Delta Q$$

where target_Q is the target segment encoding quality,
segment_BR is the target segment bit rate,
target_Q' is the previous segment target segment encoding quality,
segment_BR' is the previous segment target segment bit rate, and
K is a constant.

23. An encoding quality adjustment processor for generating a target segment encoding quality value in a moving pictures encoder for encoding a series of segments each having at least one image using a variable bit rate encoding scheme whilst maintaining a substantially constant overall bit rate, comprising:
a bits difference computation means coupled to receive a segment encoding bit utilization value and a target segment bit rate and generate therefrom a bits difference value representing a difference in bits allocated and bits used for encoding a segment;
a bits distribution means coupled to the bits difference computation means for computing at least one bits distribution value from the bits difference value and a predetermined distribution function;
a bit rate difference computation means coupled to the bits distribution means for computing a segment bit rate difference from the at least one bits distribution value and a predetermined number of images in a segment;
a target segment bit rate adjustment means coupled to the bit rate difference computation means and the bit difference computation means for computing said target segment bit rate from the segment bit rate difference and a predetermined target overall bit rate for the sequence of segments; and
an encoding quality computation means coupled to the target segment bit rate adjustment means for computing a target segment encoding quality value from said target segment bit rate.

24. The encoding quality adjustment processor of claim 23, wherein the bits difference computation means, bits distribution means, bit rate difference computation means, target segment bit rate adjustment means, and encoding quality computation means are structured to iteratively carry out their functions using the number of bits used to encode the subsequent segment and the subsequent segment bit allocation for determining said difference.

25. The encoding quality adjustment processor of claim 23, wherein each segment comprises at least one group of pictures having at least one P picture and/or at least one B picture.

26. A moving picture encoder, comprising:
a coding processor for encoding picture data based on macroblocks according to a quantization step size;
a virtual buffer processor coupled to the coding processor for tracking a number of bits used for encoding successive macroblocks in a picture and a number of bits used for encoding successive pictures in a group of pictures;
a quantization step size processor coupled to the coding processor for determining said quantization step size from a target number bits allocated for a picture and the number of bits already used for encoding macroblocks in that picture;
a picture bit allocation processor coupled to the quantization step size processor for determining said target number of bits allocated for a picture from a target bit rate and the number of bits already used for encoding pictures in a current group of pictures;
a bit rate adjustment processor coupled to the picture bit allocation processor, the virtual buffer processor and the quantization step size processor for determining said target bit rate from the number of bits already used for encoding successive pictures in the current group of pictures, a target encoding quantization step size and an average quantization step size for pictures in the current group of pictures; and
a target encoding quantization step size processor coupled to the bit rate adjustment processor and the virtual buffer processor for determining said target encoding quantization step size from a predetermined target overall bit rate and the number of bits used for encoding a preceding group of pictures.

27. The encoder of claim 26, wherein each segment comprises at least one group of pictures having at least one P picture and/or at least one B picture.

28. A method for use in a moving pictures encoder for encoding a sequence of segments by reference to a user-defined target overall bit rate, each segment having a plurality of pictures, each picture including a plurality of macroblocks, the method comprising:
(a) allocating target bits for encoding a first picture based upon a target bit rate and a global complexity measure of a previously encoded picture;
(b) encoding the first picture, including
non-recursively determining a quantization step size for each macroblock of the first picture, the quantization step size being based upon the target bits allocated to the first picture, and encoding each macroblock of the first picture based upon the quantization step size for each macroblock;

(c) determining a new target bit rate based upon a target quantization step size and the quantization step sizes of the first picture; and (d) allocating target bits for encoding a second picture based upon the new target bit rate and a global complexity measure of the first encoded picture.

29. The method of claim 28, wherein determining the new target bit rate further comprises determining the new target bit rate based upon the target quantization step size and an average of the quantization step sizes of the first encoded picture.

30. The method of claim 28, further comprising:
repeating steps (a)-(d) until a first segment is encoded; and
determining a new target quantization step size.

31. The method of claim 30, wherein determining the new target quantization step size comprises:
determining a number of bits used to encode the first segment;
determining a number of bits allocated to encode the first segment;
determining a difference between the number of bits used to encode the first segment and the number of bits allocated to encode the first segment;
distributing the difference to one or more subsequent segments for use in encoding the one or more subsequent segments;
determining a target segment bit rate for a next subsequent segment, the target segment bit rate based upon the user-defined target overall bit rate and the difference distributed to the next subsequent segment;
determining the new target quantization step size based upon the target segment bit rate; and
repeating steps (a)-(d) for encoding the next subsequent segment according to the new target quantization step size.

* * * * *